(12) United States Patent
Saund et al.

(10) Patent No.: US 6,367,901 B1
(45) Date of Patent: Apr. 9, 2002

(54) SYSTEM FOR EFFECTING ACTIONS OVER VERTICAL SURFACES

(75) Inventors: Eric Saund, San Carlos; Thomas M. Breuel, Brisbane; Kenneth P. Fishkin, Redwood City; Thomas P. Moran, Palo Alto; Daniel L. Larner, San Jose, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,468

(22) Filed: Nov. 29, 1999

(51) Int. Cl.[7] .............................................. G01D 15/16
(52) U.S. Cl. ...................... 346/139 R; 33/1 M; 33/18.1
(58) Field of Search .......................... 33/18.1, 26, 32.1, 33/32.3, 35, 1 M; 347/2; 346/139 R

(56) References Cited

U.S. PATENT DOCUMENTS

| | | | | |
|---|---|---|---|---|
| 4,412,383 A | * | 11/1983 | Landa | 33/1 M |
| 4,583,292 A | * | 4/1986 | Langberg | 33/1 M |
| 4,856,197 A | * | 8/1989 | Auer et al. | 33/1 M |
| 4,918,817 A | * | 4/1990 | Eaton | 33/1 M |
| 5,589,859 A | * | 12/1996 | Schantz | 347/19 |

FOREIGN PATENT DOCUMENTS

JP 407107220 A * 4/1995 ............ H04N/1/00

* cited by examiner

*Primary Examiner*—John Barlow
*Assistant Examiner*—Julian D. Huffman

(57) ABSTRACT

The Pendulum Whiteboard Printer is a fully-automatic robotic device for marking or otherwise effecting whiteboards, pinboards, or other vertical surfaces. The physical device consists of an effector platform suspended by two suspension wires whose lengths are adjusted by motorized spindles mounted above and on either side of the board surface. The position of the effector platform is adjusted by winding and unwinding the wires. Electrical power is supplied to the effector platform through the suspension wires or through an on-board battery. Control of a pen and/or other apparatus on the effector platform is achieved through modulation of the power voltage. A further component of this invention is electronic and computational apparatus for controlling the device, which may include automatic visual interpretation and feedback from a video camera viewing the board and printer.

16 Claims, 4 Drawing Sheets

SYSTEM FOR EFFECTING ACTIONS OVER VERTICAL SURFACES

FIELD OF THE INVENTION

The present invention relates generally to performing mechanical actions such as drawing or printing, and more particularly to a system for performing the mechanical actions such as drawing on and erasing whiteboards and other substantially vertical surfaces.

BACKGROUND OF THE INVENTION

A great deal of work has been devoted to integrating large drawing and display surfaces with electronic document faculties. Technology has been developed to support two directions of information flow, image capture, and image display.

Image capture technologies enable marks drawn on a surface to be captured in electronic form. These include the pressure-sensitive tablets such as the SMART Board from SMART Technologies, Inc. of Calgary, Alberta, Canada, location-sensitive surfaces accompanied by special pens such as the Liveboard from Xerox Corporation of Stamford, Conn., and Mimeo from Virtual Ink Corporation of Boston, Mass., Laser-based pen trackers such as the SoftBoard from Microfield Graphics, Inc. of Portland, Oreg., camera-based scanning such as the ZombieBoard from Xerox Corporation, and 1-dimensional scan bars such as the Copyboard from Xerox Corporation. The ZombieBoard is further described in U.S. Pat. No. 5,528,290 to Saund, entitled DEVICE FOR TRANSCRIBING IMAGES ON A BOARD USING A CAMERA BASED BOARD SCANNER.

Image display technologies permit stored electronic images to be displayed on a large surface. These include plasma, active matrix, liquid crystal, light-emitting diode, and projectors which can be either front-projection or rear-projection. Of the various image display technologies, only the projectors are compatible with an inexpensive, passive, surface of variable and extensible size. All of the others require dedicated display hardware which is expensive and fixed in size.

In addition to the applications for generating images on large vertical surfaces, a variety of other applications exist such as window washing, moving physical tokens, and the like.

SUMMARY OF THE INVENTION

The present invention is a system for performing mechanical actions such as drawing on substantially vertical surfaces such as whiteboards. For convenience, the present invention is referred to as a Pendulum Whiteboard Printer. The term "pendulum" is chosen because the carriage for holding the effector that performs the mechanical action, called an effector platform, is suspended against the force of gravity by suspension wires. It is not a true pendulum in the x-y plane because two wires are used. While the present invention is referred to as a printer, no printing in the traditional meaning of the word is done. Rather, all marks are drawn by moving a marking element across the surface with an effector platform.

The present invention provides an inexpensive mechanism for remotely generating images on whiteboards and other substantially vertical surfaces. The term "image" as used in this specification refers to any marking created by a marking element such as a dry-erase pen. The markings may be in the form of textual characters, straight or curved strokes, or any other types of marks that could be hand-drawn.

An effector platform is provided for holding an end effector such as the marking element. The effector platform is suspended by two wires from two spools placed near the upper, outer, boundaries of the surface to be marked on. The lengths of the two wires are adjusted to control the location of the effector platform over the surface to be marked on. These wires are typically wound on motorized spools permitting their lengths to be varied under computer control. The spools may be located above and beyond the ends of the target surface so that all parts of the surface are reachable. If needed, control signals to the effector platform can be provided through the wires using techniques well-known in the art. Power may be supplied to the effector platform through the wires or from an on-board battery.

In an alternative embodiment of the invention, a portable Pendulum Whiteboard Printer is provided in which the spools are either affixed to a wall or other suitable surface, or mounted on adjustable stands at appropriate locations with respect to the whiteboard. With the portable setup, a calibration routine should be run so that the system knows the drawing area of and locations on the whiteboard. However, even with a fixed embodiment of the whiteboard printer, occasional calibrations may be desirable. Such calibrations may be performed using any techniques known in the art. For example, one such calibration technique would be to move the effector platform to a known board location using feedback information such as video camera and resetting the coordinates describing the effector platform position.

DETAILED DESCRIPTION OF THE INVENTION

Figure 1:
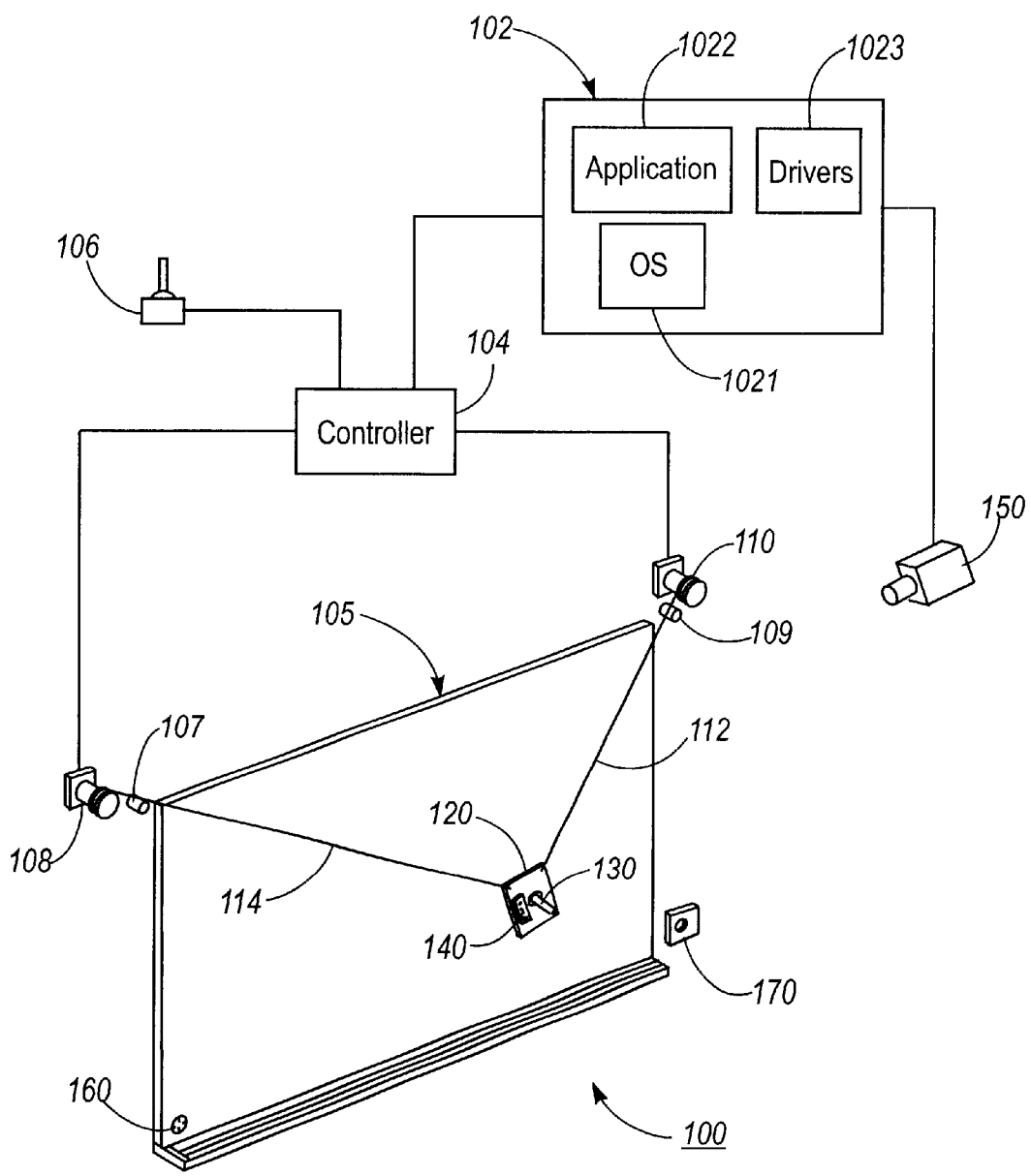
FIG. 1 is a block/perspective view diagram of a Pendulum Whiteboard Printer system according to the present invention.

FIG. 1 depicts the Pendulum Whiteboard Printer of the present invention in perspective view, including some functional block elements. An end effector 130 such as marking pen or the like is used for creating images on a whiteboard 105. Those skilled in the art will readily appreciate that a dry-erase marker will typically be used for whiteboards. Those skilled in the art will further appreciate that the present invention is not limited to marking on whiteboards, but may be used with any substantially-vertical surface, and that the action performed by the whiteboard printer is not limited to simply making marks, but may also be used for performing other actions, as is discussed in greater detail in concurrently filed, co-assigned, U.S. patent application Ser. No. 09/450,467 entitled METHOD FOR EFFECTING ACTIONS OVER VERTICAL SURFACES, which is hereby incorporated by reference into the present specification. For ease of discussion, the vertical surface will be referred to herein as a whiteboard. The marking element, or end effector, 130 is held in place and moved with an effector platform 120, which is suspended from a left wire 114 and a right wire 112. The left wire 114 is connected to a left spool 108, and the right wire 112 is connected to a right spool 110.

The left and right spools are equipped with motors (not shown) of types well-known in the art which control the reeling in and unreeling of wire from the spool. The motors may be stepper motors, or DC motors with shaft sensors or position sensors, or any other such mechanism capable of turning the spools in a controlled manner to reel in and unreel wire. Those skilled in the art will recognize that for such reasons as better control, faster acceleration, more accurate fast positioning, greater tension to control jiggle and bounce, greater tension to produce z-force, control while moving, among others, more than two wires may be used without departing from the spirit and scope of the present invention.

When the whiteboard printer 100 is not in use, the effector platform can be returned to a parking facility 170 to keep pens from drying out, among other reasons. The parking facility 170 is discussed in greater detail in concurrently filed, co-assigned, U.S. patent application Ser. No. 09/450, 484 entitled PARKING MECHANISM FOR END EFFECTORS USED FOR PERFORMING ACTIONS OVER VERTICAL SURFACES, which is hereby incorporated by reference into the present specification.

The whiteboard printer 100 will typically be controlled by a computer 102, through a controller 104, which may be implemented in hardware or software, and may be a separate unit or part of the computer 102. Alternatively, the whiteboard printer 100 may be controlled using a joystick 106 that is coupled through controller 104. The computer 102 operates under the control of Operating System (OS) 1021 and may be any general-purpose computer known in the art. The computer 102 communicates with the whiteboard printer 100 through the controller 104 by way of an interface 103, which may be any commonly-used computer communication interface such as a parallel or a serial interface. If closed-loop positioning is utilized, a camera 150 may be used to provide feedback information to the computer 102, as depicted, or directly to the controller 104. The calculations described below for positioning the effector platform 120 may be performed by the computer 102 and/or the controller 104 and may be implemented in software and/or hardware. Driver programs 1023 for application programs 1022 for such applications as word processing, spreadsheets, and presentation graphics, among others, may be provided to generate their respective outputs on large vertical surfaces. If desired, the positioning of the effector platform 120 may also be manually controlled using a joystick 106 connected to the controller 104, as shown, or to the computer 102. Signals from the computer 102 or joystick 106 are translated by the controller 104 and transmitted to the effector platform 120, where they are decoded by the onboard control electronics 140.

Since the effector platform 120 is suspended from the two wires 114 and 112, the effector platform 120 may be moved to any position beneath and between the left spool 108 and right spool 110 by adjusting the lengths of the left and right wires 114 and 112, respectively. In order to be able to mark on any part of the whiteboard 105, the left and right spools 108 and 110, respectively, are preferably placed above the top edge of the whiteboard and beyond the left and right edges of the whiteboard, respectively, as shown in FIG. 1. The positioning of the effector platform 120 will be discussed in greater detail below. The left spool 108 and right spool 110 are used to wind and unwind the respective connected left suspension wire 114 and right suspension wire 112 to thereby lengthen and shorten the suspension wire between the respective spool and the effector platform. This is referred to as open loop positioning of the effector platform.

Open Loop Positioning

Figure 2:
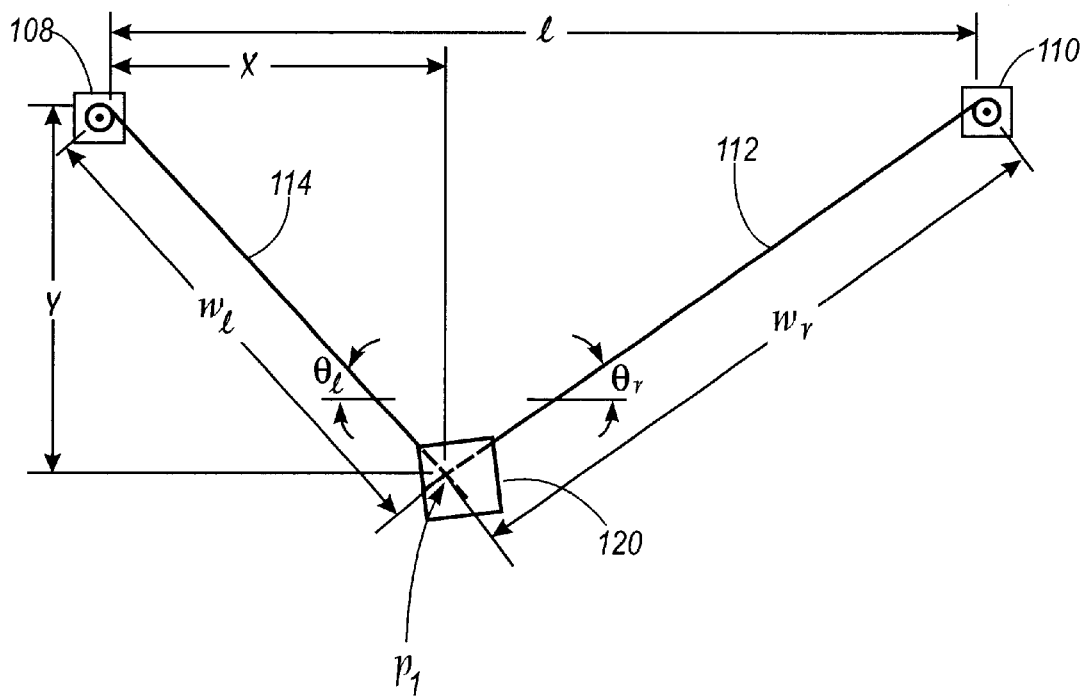
FIG. 2 is an elevation view diagram of a Pendulum Whiteboard Printer according to the present invention.

Referring to FIG. 2, the lengths of the wires are adjusted by turning the spools to wind or unwind measured lengths of wire. Since the circumference of the spools is known, it is a simple matter to determine the number turns required to reel in or out a particular length of wire.

A point $p_1$ on effector platform 120 denotes a projected intersection of the left wire 114 and right wire 112 at a given (x, y) location over the whiteboard 105. To calculate the amount to turn each spool to position the effector platform at a desired (x, y) location on the surface, we first calculate the length of the left wire 114, $w_l$, and the length of the right wire 112, $w_r$, required to position the projected wire intersection point $p_1$ at this location, as shown in FIG. 2:

$$w_l = \sqrt{x^2 + y^2} \qquad (1)$$

$$w_r = \sqrt{(l-x)^2 + y^2} \qquad (2)$$

where l is the horizontal distance between the support motors. For the purposes of the present calculations, the two spools are assumed to be at the same height. Those skilled in the art will readily appreciate that the spools need not be at the same height, but may be placed at any height relative to one another, and that the calculations would be altered to account for the vertical offset.

The (x, y) position establishes the angles $\theta_l$ and $\theta_r$ which remain approximately unchanged for small changes in platform positioning:

$$\theta_l = \arctan y/x \qquad (3)$$

$$\theta_r = \arctan y/l - x \qquad (4)$$

Figure 3:
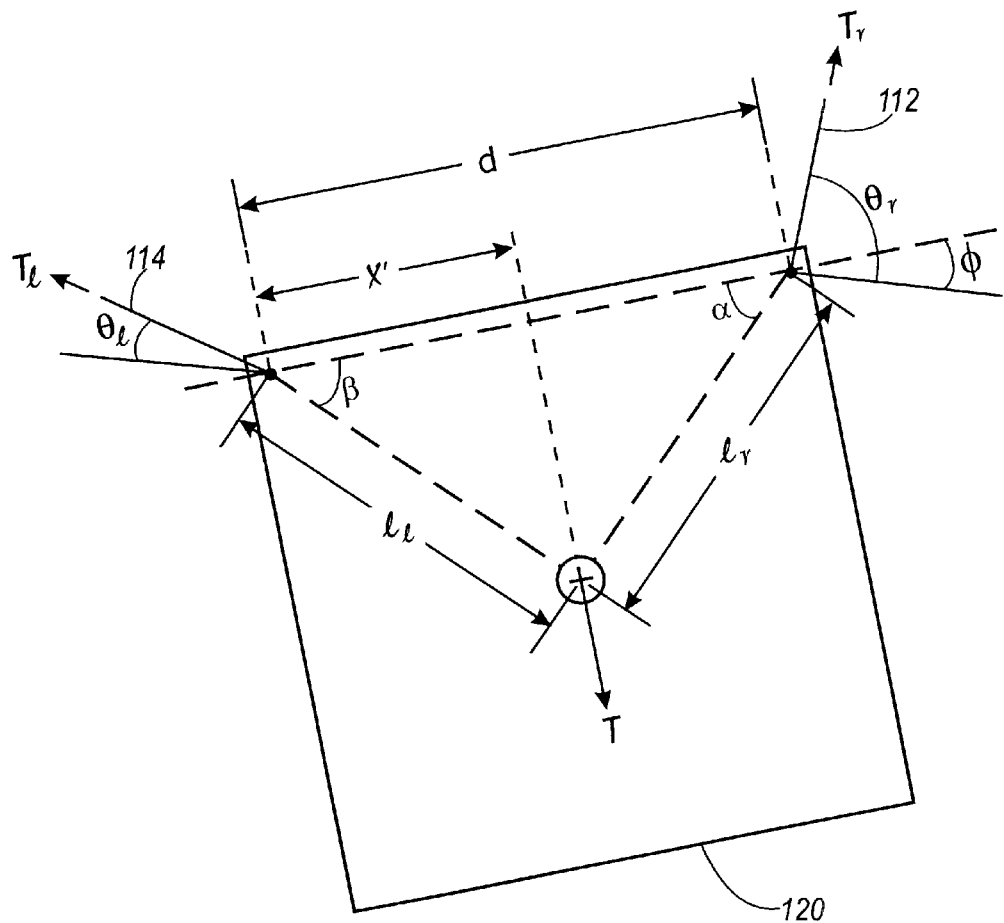
FIG. 3 is an elevation view diagram of an effector platform according to the present invention.

Fine tuning of the wire lengths $w_l$ and $w_r$ of left wire 114 and right wire 112, respectively, is then required for open-loop positioning of the pen or other effector at the target (x, y) location. This depends on the rotation angle $\phi$ that the platform takes, as shown in FIG. 3, due to the tension or force vector $T_l$ produced by the left suspension wire 114, and the tension or force vector $T_r$ produced by the right suspension wire 112.

The tensions $T_l$ and $T_r$ in the suspension wires may be determined by balancing the force components as shown:

$$T_g = mg = T_r \sin\theta_r + T_l \sin\theta_l$$

(Vertical component)

$$T_r \cos\theta_r = T_l \cos\theta_l$$

(Lateral component)

$$T_r = T_l \frac{\cos\theta_l}{\cos\theta_r}$$

$$T_l = T_r \frac{\cos\theta_r}{\cos\theta_l}$$

$$T_r \sin\theta_r + T_r \frac{\cos\theta_l \sin\theta_l}{\cos\theta_l} = mg$$

$$T_l \sin\theta_l + T_l \frac{\cos\theta_l}{\cos\theta_r} \sin\theta_r = mg$$

giving the suspension wire tensions $T_l$ and $T_r$ as:

$$T_l = \frac{mg}{\sin\theta_l + \cos\theta_l \tan\theta_r} \qquad (5)$$

$$T_r = \frac{mg}{\sin\theta_r + \cos\theta_r \tan\theta_l} \qquad (6)$$

where m is the mass of the effector platform and g is the acceleration due to gravity.

At equilibrium the torques about the center of gravity of the effector platform due to the suspension wires balance out, so the angle φ of rotation at which the effector platform is at equilibrium may be found by:

$$\phi = \arctan \frac{T_r l_r \cos\alpha(\sin\theta_r - \cos\theta_r) - T_l l_l \cos\beta(\sin\theta_l + \cos\theta_l)}{T_l l_l \sin\beta(\sin\theta_l - \cos\theta_l) + T_r l_r \sin\alpha(\sin\theta_r + \cos\theta_r)} \quad (7)$$

where α and β are the upper right and upper left interior angles of the triangle formed by the support locations and the center of gravity of the effector platform, and $l_l$ and $l_r$ are the lengths of the sides of this triangle, as shown in FIG. 3.

Referring to FIG. 3, the angles taken by the suspension wires and platform determine the projected wire intersection point $p_1$ or (x', y') in the local coordinate system of the platform, are described as:

$$y'/x' = \tan(\theta_{l+\phi})$$

$$\frac{y'}{d-x'} = \tan(\theta_r - \phi)$$

$$x' \tan(\theta_l + \phi) = (d-x')\tan(\theta_r - \phi)$$

giving $$x' = \frac{d\tan(\theta_r - \phi)}{\tan(\theta_l + \phi) + \tan(\theta_r - \phi)} \quad (8)$$

$$y' = \frac{d\tan(\theta_r - \phi)\tan(\theta_l + \phi)}{\tan(\theta_l + \phi) + \tan(\theta_r - \phi)} \quad (9)$$

where d is the distance between the suspension wire attachment points on the platform.

To determine the final tuning of suspension wire lengths required to position the pen or other effector located at $e'_x, e'_y$ in the platform coordinate system, use equations (1) and (2), but with augmented target positions (x+δx, y+δy), where the adjustment factors are given by $$\delta x = \delta x' \cos \phi + \delta y' \sin \phi \quad (10)$$

$$\delta y = -\delta x' \sin \phi \delta y' \cos \phi \quad (11)$$

giving $$\delta x' = x' - e'_x \quad (12)$$

$$\delta y' = y' - e'_y \quad (13)$$

Since the winding of the wire onto the spool makes it difficult to measure length exactly due to overlapping windings and such other problems, it is estimated that the effector platform 120 may be positioned precisely to within 6 mm, which will likely be sufficient for most applications. However, if greater positioning precision is desired, alternative wire measurement mechanisms may be employed, and/or feedback information may be used for closed-loop positioning, which will be described in greater detail below.

Returning to FIG. 1, a left wire motion sensor 107 is mounted between the whiteboard 105 and the left spool 108, and a right wire motion sensor 109 is mounted between the whiteboard 105 and the right spool 110. The left and right wire motion sensors are positioned such that the left and right wires will be in constant contact with their respective wire motion sensors. The wire motion sensors may be equipped with shaft encoders (not shown) to measure the length of wire that passes the wire motion sensor.

Figure 4:
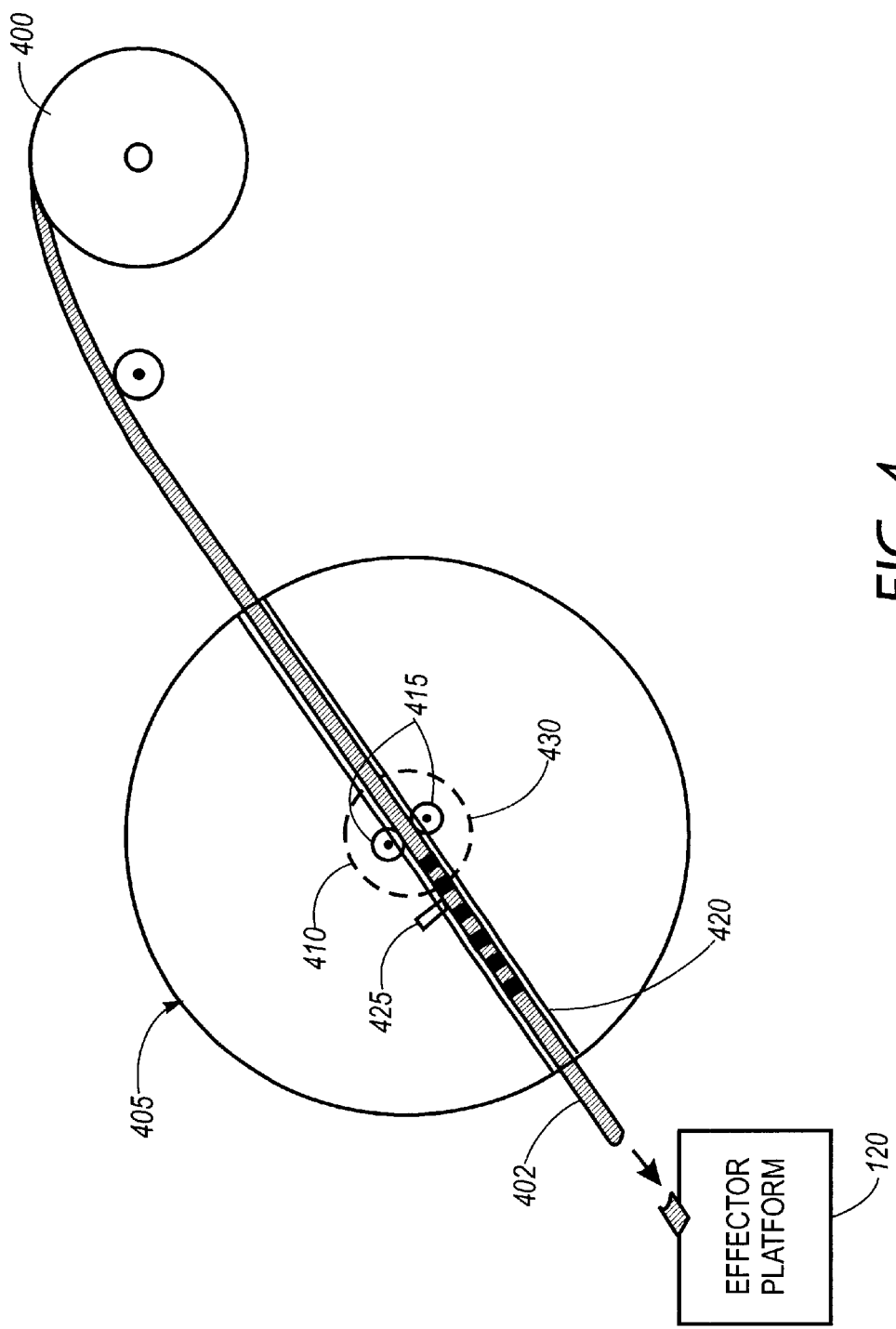
FIG. 4 is an elevation view diagram of an alternative embodiment of a portion of the Pendulum Whiteboard Printer system according to the present invention.

Referring to FIG. 4, the right side of an alternative wire extension/retraction mechanism is shown in which the spool 400 is merely used to store the wire 402. The wire is measured in and out using a pair of motorized gripping wheels 415 or the like. The gripping wheels 415 are provided in a wire driver 405 having a hollow channel 420 passing through it. The wire driver is positioned between the spool 400 and the effector platform. The wire 402 passes through the hollow channel 420 between the pair of gripping wheels 415 which are substantially diametrically opposed (relative to the wire) in the hollow channel 420. The wire is extended and retracted by rotating the pair of gripping wheels 415 in opposite directions, i.e., one clockwise and the other counter-clockwise. Lengths can be measured by number of turns of the gripping wheels, or with an sensor such as an optical sensor 425. If an optical sensor is employed, the wire 402 could be provided with evenly-spaced markings, so measured lengths of wire could be extended/retracted by counting markings. Other methods of measuring of wire to be extended and retracted may be employed in the present invention without departing from the spirit of the invention. It should be noted that the wire driver shown in FIG. 4 is depicted as circular. Those skilled in the art will readily appreciate that the shape of the wire driver need not be of any particular shape sufficient for providing the hollow tube 420 and the pair of gripping wheels 415. As shown in FIG. 4, the wire driver 405 is provided with a mounting spindle 430 which may be allowed to turn freely. This spindle allows the hollow tube 420 to freely align itself with the wire between the spool 400 and the effector platform.

Closed-loop Positioning

As noted above, the open-loop effector platform positioning described above may be augmented by feedback from external sensor information in order to achieve fine scale positioning, or when the effector platform needs to be positioned with respect to objects or markings on the surface whose exact coordinates are not known. In these cases, the motors turning the wire spools are controlled through a feedback loop.

One example of this is the use of visual feedback from a computer vision system. It is well-known in the art how to direct a calibrated camera 150 to point at a location on a surface to obtain a closeup view of, in this case, the effector platform 120. It is also well-known how to detect a special mark 160 designed for machine recognition (e.g., a circle with crosshairs inside), known as fiducial marks, corresponding to known locations on the effector platform and a target location on the surface. Any of the well-known computer vision object recognition techniques may be used to further determine the relative location of objects on the surface and the effector platform. Using the calibration geometry, it is simple to transform these image displacements into desired adjustments in the platform position, (Δx,Δy).

The relationship between instantaneous changes in effector platform (x, y) position and lengths of the suspension wires is given via the Jacobian, $$\begin{bmatrix} \partial w_l \\ \partial w_r \end{bmatrix} = \begin{bmatrix} x(x^2+y^2)^{\frac{1}{2}} & -x[(l-x)x^2+y^2]^{\frac{1}{2}} \\ y(x^2+y^2)^{\frac{1}{2}} & y[(l-x)x^2+y^2]^{\frac{1}{2}} \end{bmatrix} \begin{bmatrix} \partial x \\ \partial y \end{bmatrix} \quad (14)$$

which is used to fine-tune the position of the effector platform 120.

Power and Control

In many applications of the whiteboard printer, such as those in which the effector platform is more than an passive pen carrier, it is desirable to provide power and/or control signals to the effector platform. In such instances, the two suspension wires 114 and 112 can serve to provide both power and control signals to the effector platform 120. By using a slip-ring (not shown) or electrically conductive roller (not shown) at each spool, one of the suspension wires is made to supply power and the other as a ground. These voltages may be modulated such as with high-frequency signals carrying control information to the effector platform. The on-board electronics 140 of the effector platform demodulate the signal from the power voltage using simple electronics. The signal itself is used by the onboard electronic controller to activate motors, solenoids, lights, etc. as needed. In an alternative embodiment, power may be supplied to the effector platform through an on-board battery (not shown). Using a battery can be advantageous in not requiring power to be transmitted down the suspension wires, which will allow different materials to be used as the wire as well as reduce the signal noise on the those wires, assuming signals are also transmitted down the suspension wires.

The effector platform is discussed in greater detail in concurrently filed, co-assigned, U.S. patent application Ser. No. 09/450,484 entitled EFFECTOR PLATFORM FOR PERFORMING ACTIONS OVER VERTICAL SURFACES, which is hereby incorporated by reference into the present specification.

What is claimed is:

1. A whiteboard printer suitable for creating an image on a substantially vertical display surface, the whiteboard printer comprising:
    effector platform means for receiving a marking means for creating marks on the display surface;
    means for moving said effector platform means consisting of:
        first effector platform positioning means connected to the effector platform by a first wire, the first effector platform positioning means for moving the effector platform in a first direction, the first direction being either toward or away from the first effector platform positioning means; and
        second effector platform positioning means connected to the effector platform by a second wire, the second effector platform positioning means for moving the effector platform in a second direction, the second direction being either toward or away from the second effector platform positioning means; and
    coordinating means connected to and in communication with the first and second effector platform positioning means, the coordinating means for controlling the first and second effector platform positioning means to move the effector platform in a desired direction.

2. The whiteboard printer of claim 1, wherein the first effector platform positioning means is a first spool having the first wire attached thereto.

3. The whiteboard printer of claim 2, wherein the first effector platform positioning means moves the effector platform in a first direction toward and away from the first effector platform positioning means by reeling in the first wire onto the first spool and unreeling the first wire from the first spool, respectively.

4. The whiteboard printer of claim 3, wherein the first wire is reeled in onto the first spool and unreeled from the first spool in response to an instruction from the coordinating means.

5. The whiteboard printer of claim 2, wherein the first spool is a motor.

6. The whiteboard printer of claim 5, wherein the location sensing means comprises a camera.

7. The whiteboard printer of claim 1, wherein the first effector platform positioning means is a first wire motion sensing means for measuring a length of the first wire that passes the first wire motion sensing means.

8. The whiteboard printer of claim 1, wherein the first effector platform positioning means is a first wire driving means for advancing and retracting a known length of the first wire.

9. A whiteboard printer suitable for creating an image on a substantially vertical surface, the whiteboard printer comprising:
    end effector means for performing an action over the substantially vertical surface;
    effector platform means for receiving and carrying the end effector means;
    means for moving said effector platform means consisting of:
        first effector platform positioning means connected to the effector platform by a first wire, the first effector platform positioning means for moving the effector platform in a first variable direction; and
        second effector platform positioning means connected to the effector platform by a second wire, the second effector platform positioning means for moving the effector platform in a second variable direction; and
        coordinating means connected to and in communication with the first and second effector platform positioning means, the coordinating means for controlling the first and second effector platform positioning means to move the effector platform in a desired direction.

10. The whiteboard printer of claim 9, wherein the first effector platform positioning means is a motorized spool about which the first wire is wound and unwound to control a length of wire between the first effector platform positioning means and the effector platform.

11. The whiteboard printer of claim 9, wherein the first wire carries a signal to the effector platform.

12. The whiteboard printer of claim 10, wherein the first effector platform positioning means is a first wire motion sensing means for measuring a length of the first wire that passes the first wire motion sensing means.

13. The whiteboard printer of claim 10, wherein the first effector platform positioning means is a first wire driving means for advancing and retracting a known length of the first wire.

14. A whiteboard printer suitable for creating an image on a substantially vertical display surface, the whiteboard printer comprising:
    an end effector;
    an effector platform receiving and carrying the end effector;
    an effector platform positioner consisting of:
        a first effector platform positioner that moves the effector platform in a first variable direction, the first effector platform positioner being connected to the effector platform by a first wire; and
        a second effector platform positioner that moves the effector platform in a second variable direction, the second effector platform positioner being connected to the effector platform by a second wire; and
    a computer-controlled coordinator that controls the first and second effector platform positioning to move the effector platform in a desired direction.

15. The whiteboard printer of claim 14, wherein the first effector platform positioner and the second effector platform positioner are independent from one another.

16. The whiteboard printer of claim 14, wherein the computer-controlled coordinator further controls the end effector to perform an action.

* * * * *